(12) United States Patent
Zhao

(10) Patent No.: US 7,756,992 B1
(45) Date of Patent: Jul. 13, 2010

(54) RELIABLE DELIVERY OF UPDATES FOR ANTIVIRUS PROGRAMS

(75) Inventor: Xiaoming Zhao, Jiangsu (CN)

(73) Assignee: Trend Micro Incorporated, Tokyo (JP)

( * ) Notice: Subject to any disclaimer, the term of this patent is extended or adjusted under 35 U.S.C. 154(b) by 1321 days.

(21) Appl. No.: 11/242,178

(22) Filed: Sep. 30, 2005

(51) Int. Cl.
G06F 11/30 (2006.01)
G06F 12/14 (2006.01)
G06F 15/16 (2006.01)
G06F 15/173 (2006.01)

(52) U.S. Cl. .................. 709/231; 713/188; 709/203; 717/171; 717/172

(58) Field of Classification Search ............. 709/231, 709/200–203, 217–224; 713/188; 717/171, 717/172; 707/9, 10, 102
See application file for complete search history.

(56) References Cited

U.S. PATENT DOCUMENTS

| | | | |
|---|---|---|---|
| 6,675,340 B1* | 1/2004 | Hardie et al. | 714/751 |
| 6,966,059 B1* | 11/2005 | Shetty et al. | 717/172 |
| 7,017,102 B1* | 3/2006 | Kristensson et al. | 714/786 |
| 7,080,000 B1* | 7/2006 | Cambridge | 703/21 |
| 7,330,444 B1* | 2/2008 | Pasqua | 370/282 |
| 2002/0170052 A1* | 11/2002 | Radatti | 717/171 |
| 2003/0195946 A1* | 10/2003 | Yang | 709/219 |
| 2004/0005873 A1* | 1/2004 | Groenendaal et al. | 455/410 |
| 2005/0138395 A1* | 6/2005 | Benco et al. | 713/188 |
| 2005/0227669 A1* | 10/2005 | Haparnas | 455/410 |
| 2005/0286466 A1* | 12/2005 | Tagg et al. | 370/329 |
| 2006/0161985 A1* | 7/2006 | Zhao | 726/24 |
| 2006/0294105 A1* | 12/2006 | Rosenan et al. | 707/9 |
| 2007/0100834 A1* | 5/2007 | Landry et al. | 707/10 |
| 2007/0244920 A1* | 10/2007 | Palliyil et al. | 707/102 |
| 2008/0120350 A1* | 5/2008 | Grabowski et al. | 707/202 |
| 2008/0208935 A1* | 8/2008 | Palliyil et al. | 707/204 |

OTHER PUBLICATIONS

Paila, et al., "Flute—File Delivery Over Unidirectional Transport", Oct. 2004, pp. 1-33. [retrieved on Sep. 14, 2005]. Retrieved from the Internet <URL:http://www.ietf.org/rfc/rfc3926.html>.
Luby, et al., "Forward Error Correction (FEC) Building Block", Dec. 2002, pp. 1-16. [retrieved on Sep. 1, 2005]. Retrieved from the Internet <URL:http://www.apps.ietf.org/rfc/rfc3452.html>.

* cited by examiner

Primary Examiner—Haresh N Patel
(74) Attorney, Agent, or Firm—Okamoto & Benedicto LLP

(57) ABSTRACT

In one embodiment, an update file for an antivirus program is disassembled into several source packets. The source packets may be encoded using a forward error correction (FEC) algorithm to generate encoded packets. The encoded packets may include the source packets and redundant packets, the redundant packets including information that allows a client computer that includes the antivirus program to recreate the source packets even if it never receives all of the encoded packets. The FEC algorithm may be selected from several FEC algorithms based on the number of the source packets. The transmission of the encoded packets from a server computer to the client computer may be stopped when the client computer has received enough of the encoded packets to recreate the source packets.

18 Claims, 13 Drawing Sheets

RELIABLE DELIVERY OF UPDATES FOR ANTIVIRUS PROGRAMS

BACKGROUND OF THE INVENTION

1. Field of the Invention

The present invention relates generally to computer systems, and more particularly but not exclusively to data transfer over a packet network.

2. Description of the Background Art

Computer viruses, worms, Trojans, and spyware are examples of malicious codes that have plagued computer systems throughout the world. Although there are technical differences between each type of malicious code, malicious codes are collectively referred to herein as "viruses", as is common in the industry. Generally speaking, a computer virus can corrupt or delete important files, send e-mails without user authorization, render a computer inoperable, or cause other types of damage to a computer. Computers may incorporate antivirus programs as a protective measure against viruses.

A typical antivirus program uses a pattern file to scan a computer for viruses. The pattern file includes the patterns (also referred to as "signatures") of known viruses, algorithms for detecting viruses, and/or other antivirus-related information. The antivirus program uses the pattern file as a reference in determining if data, such as those in files, contain a virus. Antivirus programs, including their pattern files, may be continually updated to keep up with new viruses. These updates to antivirus programs ("updates") are typically delivered from a vendor server computer to a customer client computer over a computer network, such as the Internet.

During a virus outbreak, the Internet and private computer networks may be severely congested with traffic. For example, network viruses may actively use a lot of bandwidth as they spread through the network and conduct illegal network communications. Network congestion may lead to packet loss and peer to peer delay. Unfortunately, updates to antivirus programs must still be delivered to customer client computers to combat the viruses even when the networks are heavily congested with traffic.

What is needed is a technique for reliable and reasonably fast delivery of updates to antivirus programs over a congested computer network.

SUMMARY

In one embodiment, an update file for an antivirus program is disassembled into several source packets. The source packets may be encoded using a forward error correction (FEC) algorithm to generate encoded packets. The encoded packets may include the source packets and redundant packets, the redundant packets including information that allows a client computer that includes the antivirus program to recreate the source packets even if it never receives all of the encoded packets. The FEC algorithm may be selected from several FEC algorithms based on the number of the source packets. The transmission of the encoded packets from a server computer to the client computer may be stopped when the client computer has received enough of the encoded packets to recreate the source packets.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may then be executed by a processor. Components may be implemented separately in multiple modules or together in a single module.

Conventional mechanisms for delivering updates to antivirus programs resident in customer client computers are based on the Transport Control Protocol (TCP), such as the HyperText Transport Protocol (HTTP) or File Transfer Protocol (FTP). TCP is an example of a protocol that uses so-called "automatic request for retransmission" or ARQ. As such, TCP based update delivery mechanisms rely on acknowledgements and, in cases where an acknowledgement is not received for transmitted data after a period of time, retransmissions of lost data. While TCP based update delivery mechanisms are relatively effective during normal network conditions, they can't reliably deliver updates on time when the network becomes congested. The Internet Engineering Task Force (IETF) proposes an experimental non-ARQ based data delivery mechanism called "File Delivery over Unidirectional Transport" or FLUTE. FLUTE employs Forward Error Correction (FEC), which involves sending original data along with redundant data. However, FLUTE has features that are not conducive for update delivery to customer client computers including dependent on IP multicasting support, difficulty in traversing firewalls, lack of special consideration for handling congested network conditions, and use of layered coding and related traffic control mechanisms that are not suitable for congested networks. Embodiments of the invention overcome the limitations TCP based update delivery mechanisms and FLUTE to allow for reliable delivery of updates to antivirus programs even when the network is heavily congested with traffic, such as during a virus outbreak.

Figure 1:
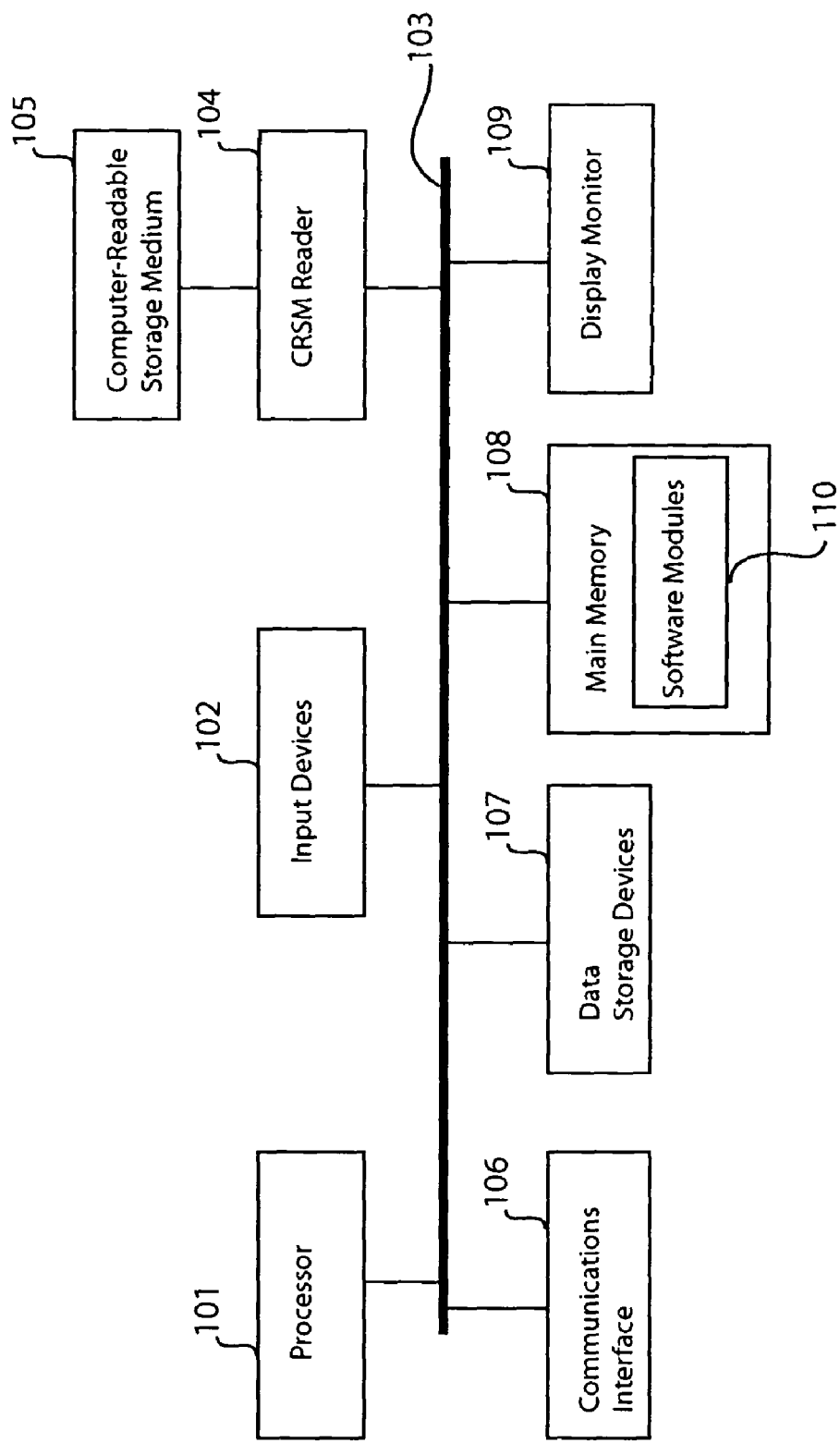
FIG. 1 shows a schematic diagram of an example computer that may be used in embodiments of the present invention.

Referring now to FIG. 1, there is shown a schematic diagram of an example computer that may be used in embodiments of the present invention. Depending on its configuration, the computer shown in the example of FIG. 1 may be employed as a client computer or a server computer, for example. The computer of FIG. 1 may have less or more components to meet the needs of a particular application. As shown in FIG. 1, the computer may include a processor 101, such as those from the Intel Corporation or Advanced Micro Devices, for example. The computer may have one or more buses 103 coupling its various components. The computer may include one or more input devices 102 (e.g., keyboard, mouse), a computer-readable storage medium (CRSM) 105 (e.g., floppy disk, CD-ROM), a CRSM reader 104 (e.g., floppy drive, CD-ROM drive), a display monitor 109 (e.g., cathode ray tube, flat panel display), a communications interface 106 (e.g., network adapter, modem) for coupling to a network, one or more data storage devices 107 (e.g., hard disk drive, optical drive, FLASH memory), and a main memory 108 (e.g., RAM). Software embodiments may be stored in a computer-readable storage medium 105 for reading into a data storage device 107 or main memory 108. Software embodiments may also be received over a computer network by way of communications interface 106. In the example of FIG. 1, main memory 108 includes software modules 110, which may comprise software components of a networking protocol stack, described later on below with reference to FIG. 3. The software modules 110 may be executed by processor 101.

Figure 2:
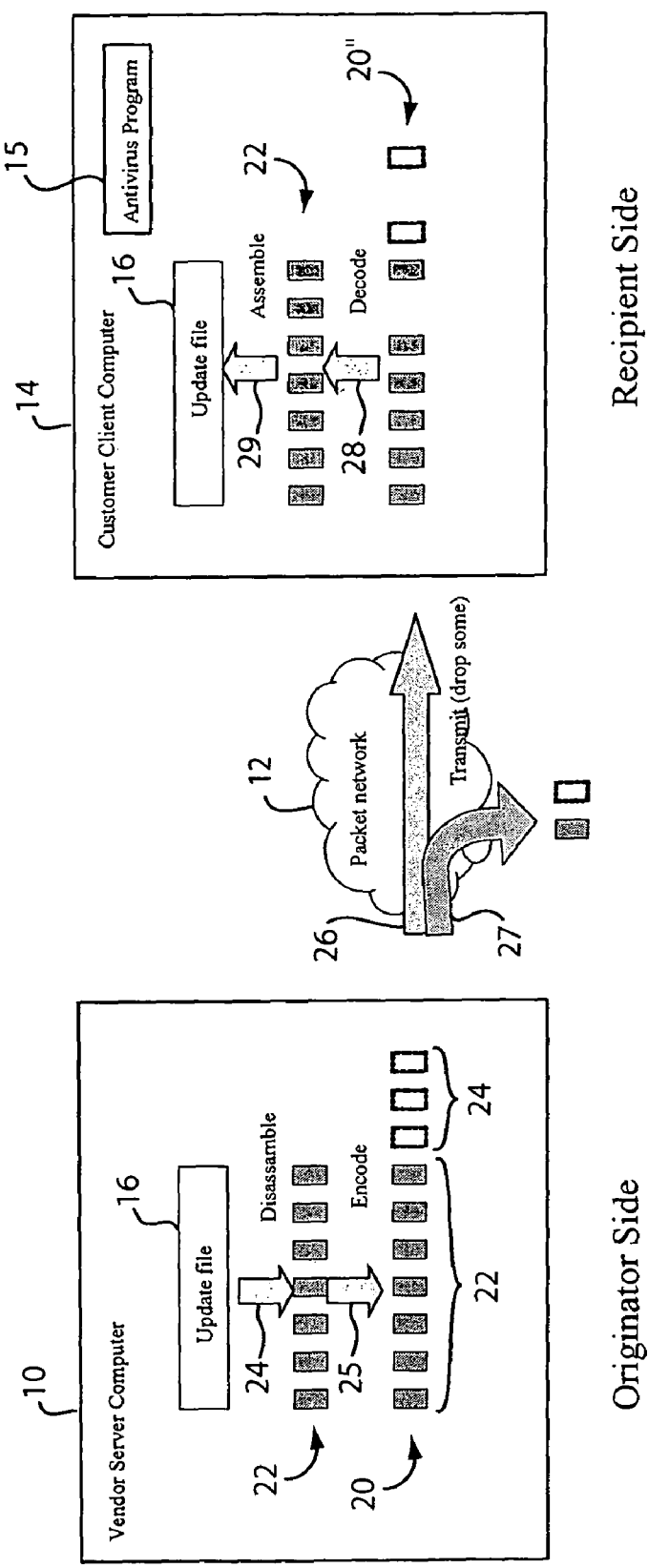
FIG. 2 schematically shows a computing environment for delivering updates to antivirus programs in accordance with an embodiment of the present invention.

FIG. 2 schematically shows a computing environment for delivering updates to antivirus programs in accordance with an embodiment of the present invention. In the example of FIG. 2, a vendor server computer 10 provides updates to an antivirus program 15 resident in a customer client computer 14. The updates may comprise a new virus pattern file or antivirus algorithm, for example. In the example of FIG. 2, the updates are packaged as a file 16 transmitted by the vendor server computer 10 to the customer client computer 14 over a packet network 12. The packet network 12 may comprise the Internet and other computer networks, such as a local area network to which the customer client computer 14 belongs. The vendor server computer 10 may comprise a server computer operated by the vendor of the antivirus program 15.

In one embodiment, the update file 16 is disassembled into several source packets 22 (see arrow 24). That is, the update file 16 is broken down into several portions, with the portions being encapsulated into the source packets 22 for transmission over the packet network 12. The number of source packets 22 is also referred to as "source size." The source packets 22 are encoded to generate a block of encoded packets 20 (see arrow 25). In one embodiment, the source packets 22 are encoded using a Forward Error Correction (FEC) algorithm such that the encoded packets 20 comprise the source packets 22 and redundant packets 24. The total number of packets forming the encoded packets 20 is also referred to as "block size." The redundant packets 24 are generated from the source packets 22. As their name implies, the redundant packets 24 comprise redundant information allowing the customer client computer 14 to recreate the source packets 22 even if some of the encoded packets 20 are lost during transmission and never received in the customer client computer 14. Backward going traffic for acknowledging receipt of the encoded packets 20 in the customer client computer 14 and for retransmission of lost packets is therefore not required, but may be advantageous in certain situations as further discussed below. This helps speed up the update delivery process especially in situations where the packet network 12 is heavily congested with traffic.

The number of redundant packets 24 in the encoded packets 20 may depend on the particulars of the encoding algorithm and the objective to achieve. Selection of the encoding algorithm may be based on an adaptive policy that takes into account message size (M), the expected packet loss (PI), and the minimum success probability under maximum packet loss (Pd). In one embodiment, different encoding algorithms are employed depending on the size of the message. The message size (M) may be given in terms of the number of source packets 22 needed to represent it. If the message is relatively small and can fit into a single source packet 22, the single source packet 22 may just be duplicated several times as redundant packets 24 using a replication algorithm. If the message is medium in size, Minimum Distance Separation (MDS) FEC algorithms with no encoding overhead, such as the Reed-Solomon Erasure algorithm, may be used. If the message is relatively large, an MDS FEC algorithm may require too much computing power. In that case, when the message is relatively large, a large block FEC algorithm, such as Low Density Parity Check (LDPC) or Low Density Generator Matrix (LDGM), may be used. The selection of an encoding algorithm is further discussed below with reference to FIG. 9. Other FEC algorithms may also be used without detracting from the merits of the present invention.

An FEC ratio (F) refers to the ratio of the number of encoded packets 20 to the number of source packets 22 (i.e. ratio of block size to source size). The FEC ratio (F) may be a function of the message size (M), expected packet loss (PI), and the minimum success probability under maximum packet loss (Pd). For example, assuming M=1 source packet, $PI \leq 40\%$, and $Pd \geq 99.9\%$, then F may be equal to 8. With the same PI and Pd, but with M=10 source packets, then F may be equal to 3. With the same PI and Pd, but with M=100 source packets, then F may be equal to 2, and so on. The calculation of the FEC ratio (F) may be based on probability theory, and may vary depending on the application.

As shown in FIG. 2, the encoded packets 20 are transmitted over the packet network 12 to the customer client computer 14 (see arrow 26). When the packet network 12 is heavily congested with traffic, or other conditions, routers or other network components in the packet network 12 may start dropping some encoded packets 20 (see arrow 27). The remaining encoded packets 20, now labeled as encoded packets 20", are received in the customer client computer 14, where the source packets 22 are recreated by decoding the encoded packets 20" (see arrow 28). The source packets 22 are then reassembled back into the update file 16 (see arrow 29), which is used to update the antivirus program 15.

Figure 3:
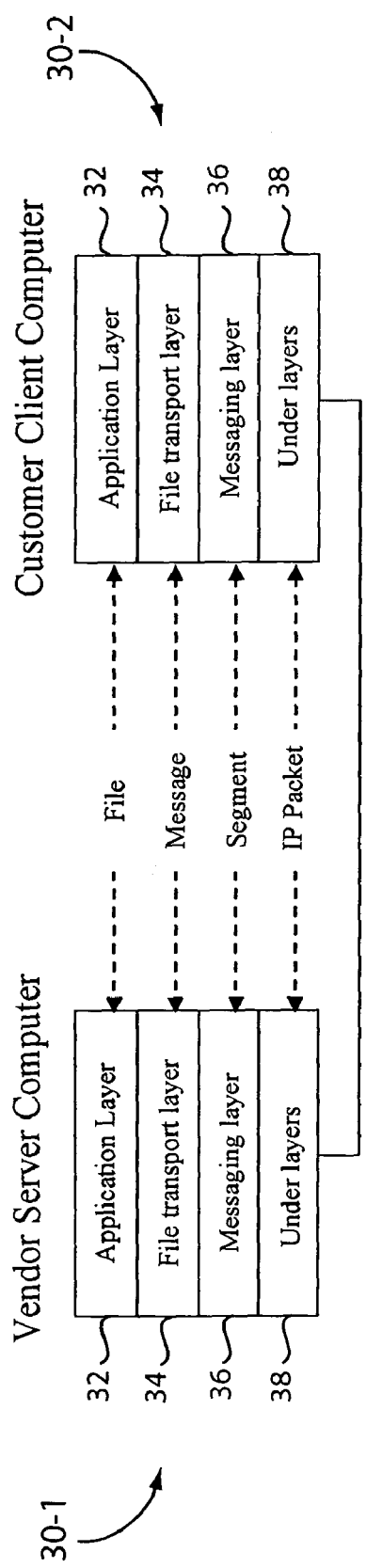
FIG. 3 schematically shows the layers of a networking protocol stack in accordance with an embodiment of the present invention.

FIG. 3 schematically shows the layers of a networking protocol stack 30 (i.e. 30-1, 30-2) in accordance with an embodiment of the present invention. A protocol stack 30 may include an application layer 32, a file transport layer 34, a messaging layer 36, and under layers 38. A protocol stack 30 allows two peers (i.e. layers on the same level of the protocol stack) to exchange data over a packet network. In one embodiment, the vendor server computer 10 and the customer client computer 14 each includes a protocol stack 30 for transmitting and receiving data over the packet network 12.

As its name implies, an application layer 32 may comprise application programs. For example, the application layer 32 in the protocol stack 30-2 of a customer client computer may include an antivirus program, which periodically sends requests for update files to a vendor server computer. The application layer 32 in the protocol stack 30-1 of the vendor server computer may include a file server program for servicing requests for update files. Upon receipt of a request for update files, the vendor server computer may proceed to transmit update files to the customer client computer. Similar to other protocol stacks, a protocol stack 30 allows its various layers to communicate by going through the stack. For example, to send an update file from the vendor server computer to the customer client computer, the update file is processed through layers 32, 34, 36, and 38, in that order, in the vendor server computer and then through layers 38, 36, 34, and 32, in that order, in the customer client computer. Applications in application layers 32 may exchange files, entities of file transport layers 34 may exchange messages, entities of messaging layers 36 may exchange segments, and entities of under layers 38 may exchange Internet Protocol (IP) packets.

A file transport layer 34 may comprise computer-readable program code for providing file delivery services to applications in an application layer 32. A file transport layer 34 provides an interface between an application layer 32 and a messaging layer 36. Two file transport layers 34 may exchange messages. A message may include a file, command, status, or other type of information. The file transport layer 34 may act like an HTTP protocol, for example. In one embodiment, a file transport layer 34 supports a "GET command" to get a file from a remote server computer. For example, an antivirus program in the application layer 32 of protocol stack 30-2 may send a GET command to the file transport layer 34 of the protocol stack 30-2 to request an update file from the vendor server computer. The file transport layer 34 of protocol stack 30-2 may receive and process the GET command such that the corresponding file transport layer 34 in the protocol stack 30-1 may obtain an update file and forward the update file to the file transport layer 34 of the protocol stack 30-2. The transport layer 34 of the protocol stack 30-2 may then provide the update file to the antivirus program. A file transport layer 34 may similarly support a "PUT command" to store a file in a remote server computer.

A messaging layer 36 may comprise computer-readable program code for providing reliable message service. Two messaging layers 36 may exchange segments containing encoded packets. In one embodiment, a messaging layer 36 may perform disassembly of a message into one or more source packets, assembly of one or more source packets into a message, encoding of source packets into encoded packets, and decoding of encoded packets into source packets. For example, a messaging layer 36 in the protocol stack 30-1 of the vendor server computer may receive a message containing an update file from a file transport layer 34, disassemble the message into several source packets, encode the source packets into encoded packets using an FEC algorithm, encapsulate encoded packets into segments, and then provide the segments to the under layers 38 for transmission to the customer client computer. At the customer client computer, a messaging layer 36 of the protocol stack 30-2 may receive the encoded packets from the underlayers 38, decode the encoded packets to recreate the source packets, assemble the source packets to recreate the message, and then provide the message to a file transport layer 34, which proceeds to deliver the update file from the message to the antivirus program.

The under layers 38 may comprise computer readable program code for supporting transmission and reception of encoded segments over a packet network. For example, the under layers 38 may comprise conventional protocol stack for transmitting and receiving packets over a network conforming to the Internet Protocol (IP). In one embodiment, the under layers 38 include the User Datagram Protocol (UDP). As is well known, UDP is a connection-less protocol used with IP. In the example of FIG. 3, a messaging layer 36 may sit on top of a UDP/IP stack to be able to send and receive encoded packets using IP packets over a packet network. The mechanics of using UDP to send and receive data over a computer network, in general, is well known and not further described here.

Figure 4:
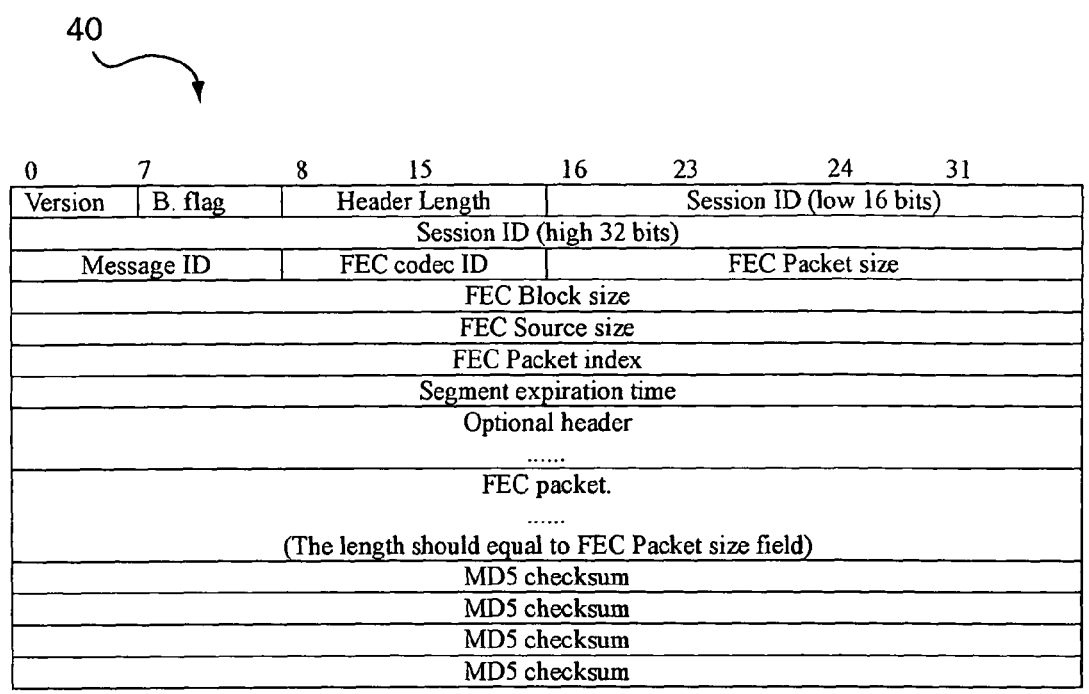
FIG. 4 schematically shows a segment in accordance with an embodiment of the present invention.

FIG. 4 schematically shows a segment 40 in accordance with an embodiment of the present invention. In the example of FIG. 4, an FEC algorithm is used to encode source packets. Accordingly, an encoded packet is referred to as "FEC packet"; the number of encoded packets is referred to as "FEC block size," the number of the source packets is referred to as "FEC source size," and so on. In the example of FIG. 4, the segment 40 supports encapsulation of a single FEC packet. Multiple segments 40 may be generated and transmitted to support encapsulation of multiple FEC packets. For example, an update file may be disassembled into one or more source packets, then encoded using an FEC algorithm into several FEC packets, each of which is encapsulated in a segment 40. Table 1 provides a description of the fields of an example segment 40. The fields of a segment 40 may be varied without detracting from the merits of the present invention.

TABLE 1

| | |
|---|---|
| Version | 4 bits integer. Should be 1 in this example. If a peer received a segment with Version field not equal to 1, it should discard the segment. |
| B. flag | 4 bits integer. A flag for limited broadcasting relay. value: 0 segment is from its original source and should not be relayed. 1 segment is expected to be relayed to limited broadcasting address. 2 segment is relayed by another client node and should not be relayed again. others segment should be discarded. |
| Header Length | 8 bits unsigned integer. The length of the header in bytes from "version" field to and include "optional header" field. |
| Session ID | 6 bytes integer. ID to distinguish which session the segment belongs to. Should not repeat in the whole network in certain period of time for different sessions. |
| Message ID | 8 bits unsigned integer. ID to distinguish which message the segment belongs to. For each Session, the first message that initiates the session always has message ID of 0. Following message use a message ID 1 above the previous one. |
| FEC codec ID | 8 bits integer. ID of FEC algorithm. 0 replication codec 1 RSE codec 2 LDGM staircase codec 3 LDGM triangle codec |
| FEC packet size | 2 bytes integer. Size of FEC packet in bytes. The choice of packet size should base on the calculation of MTU of the transport link. For example, provided UDP packet's MTU is 576, FEC packet size should equal to 576-28 (UDP header) − 28 (message header) − 16 (MD5 checksum) = 504. Replication FEC algorithm is an exception where FEC packet size should equal to the length of source data. Note: if last source packet of a message is shorter than the common packet size, it should be zero padded to the same length. |
| FEC block size | 4 bytes unsigned integer. Block size parameter of FEC algorithm. |
| FEC source size | 4 bytes unsigned integer. Source size parameter of FEC algorithm. |
| FEC packet index | 4 bytes unsigned integer. Indicate the packet index of this packet in a FEC block. |
| Segment expiration time | 4 bytes integer. Universal time in seconds from 1970.1.1 midnight. |
| Optional header | Variable length field that may extend the message header. There is not optional header at current phase. |
| FEC packet. | Variable length field. Payload of the segment. These bytes are FEC packet generated by FEC encoder and will be decoded by FEC decoder. |
| MD5 checksum | 16 bytes octet stream. MD5 digest of segment contents from "header length" field to the end of FEC packet and a shared key. |

Figure 5:
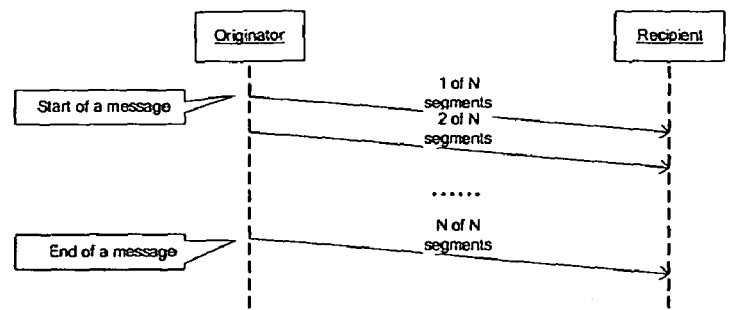
FIG. 5 schematically illustrates a one way messaging sequence in accordance with an embodiment of the present invention.

FIG. 5 schematically illustrates a one way messaging sequence in accordance with an embodiment of the present invention. In the example of FIG. 5, N segments, each encapsulating an encoded packet, are transmitted one by one from the originator (e.g. vendor server computer) to the recipient (e.g. customer client computer). The example of FIG. 5 is a one way transmission in that it does not involve backward traffic for acknowledgements and the like. Accordingly, the example of FIG. 5 is advantageous in situations where the network is heavily congested.

Figure 6:
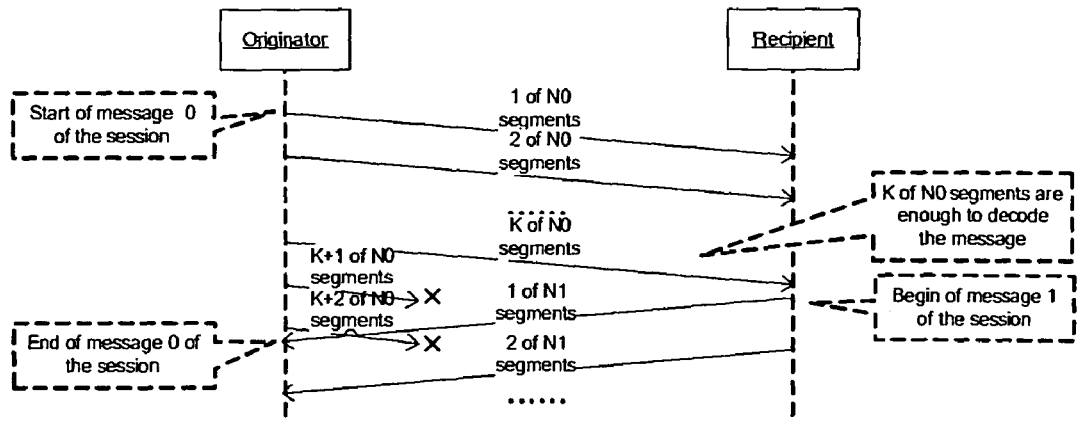
FIG. 6 schematically illustrates an interactive messaging sequence in accordance with another embodiment of the present invention.

FIG. 6 schematically illustrates an interactive messaging sequence in accordance with another embodiment of the present invention. In the example of FIG. 6, a message 0 from the originator comprises N0 segments and a message 1 from the recipient comprises N1 segments, with each segment containing encoded packets. The originator sends 1 of N0 segments, 2 of N0 segments, and so on one at a time to the recipient. When the recipient determines that it has enough N0 segments to recreate the original message, say at receipt of K of N0 segments, the recipient responds to the originator by sending 1 of N1 segments, 2 of N1 segments, and so on. Upon receipt of first of N1 segments of message 1, the originator stops sending the rest of message 0, i.e. K+1 of N0 segments, K+2 of N0 segments, . . . N0 of N0 segments. The example of FIG. 6 is interactive in that the recipient informs the originator if it has enough encoded packets to recreate the original message, thereby advantageously preventing transmission of encoded packets that are no longer required.

Figure 7:
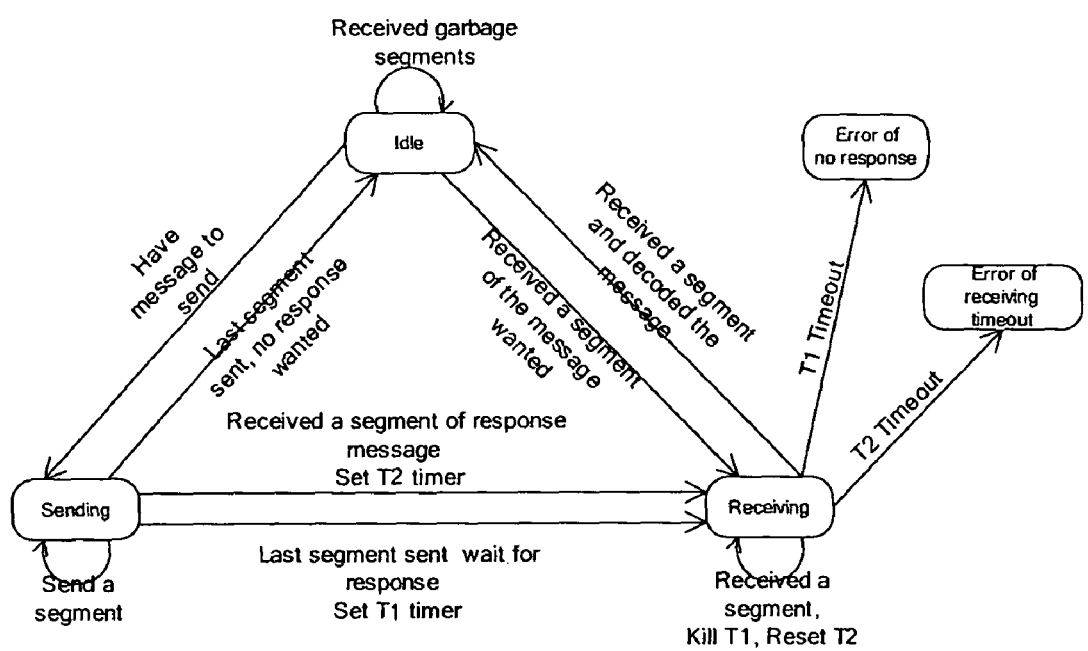
FIG. 7 shows a state transition diagram for messaging layers in accordance with an embodiment of the present invention.

FIG. 7 shows a state transition diagram for messaging layers in accordance with an embodiment of the present invention. The state diagram of FIG. 7 may be employed for either the messaging sequence of FIG. 5 or FIG. 6. In the example of FIG. 7, a one way messaging sequence is performed by simply moving from the Idle state to the Sending state to send messages, then moving from the Sending state to the Idle state once all the segments have been sent. When a response is needed, as in an interactive messaging sequence, two timers referred to as "T1" and "T2" may be employed. Timer T1 (e.g. set to about 15 seconds) may be a timer for detecting a situation where the recipient does not send a response back, while timer T2 (e.g. set to about 5 seconds) may be a timer for detecting a situation where the receiving of a message is interrupted. Other state transition diagrams may also be employed without detracting from the merits of the present invention.

Figure 8:
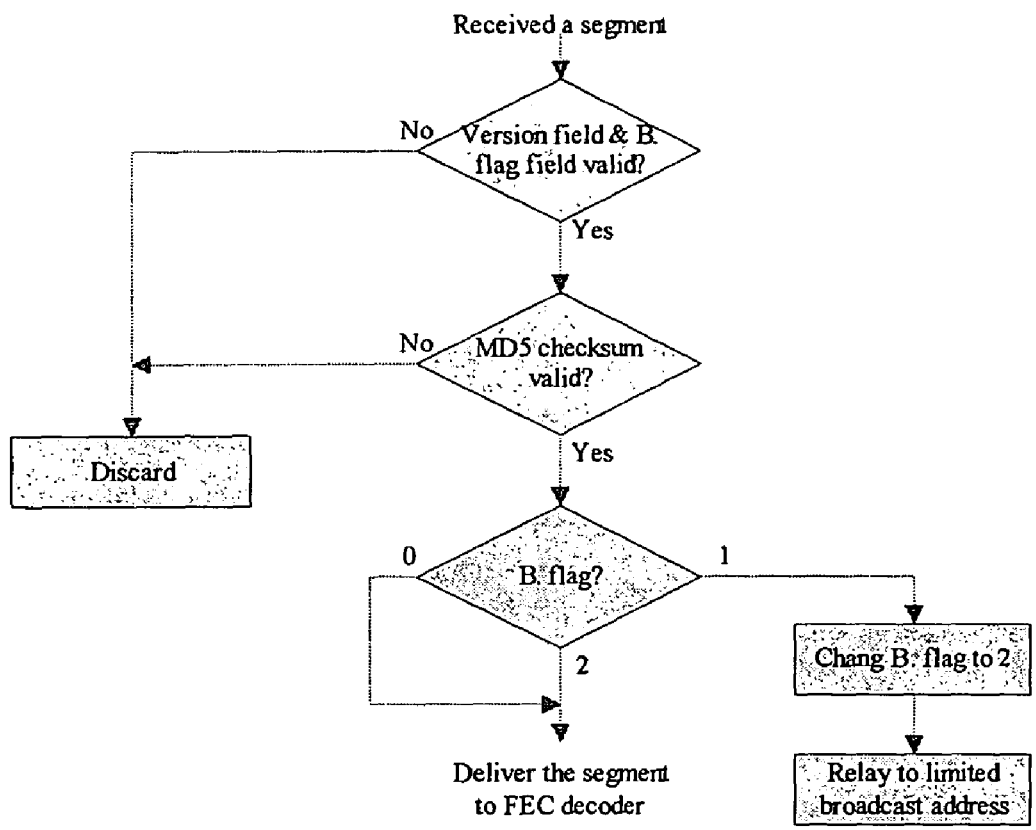
FIG. 8 shows a flow diagram of a method of pre-processing a received segment in accordance with an embodiment of the present invention.

FIG. 8 shows a flow diagram of a method of pre-processing a segment in accordance with an embodiment of the present invention. The method of FIG. 8 may be performed by a messaging layer 36 upon receipt of a segment and prior to processing the segment. As shown in FIG. 8, the messaging layer 36 may first check the version and checksum of the segment to ensure they are valid. The "B. Flag", described in Table 1, indicates relaying options and is examined to determine if the segment should be sent to the decoder (FEC decoder in this example) or relayed to a broadcast address.

Figure 9:
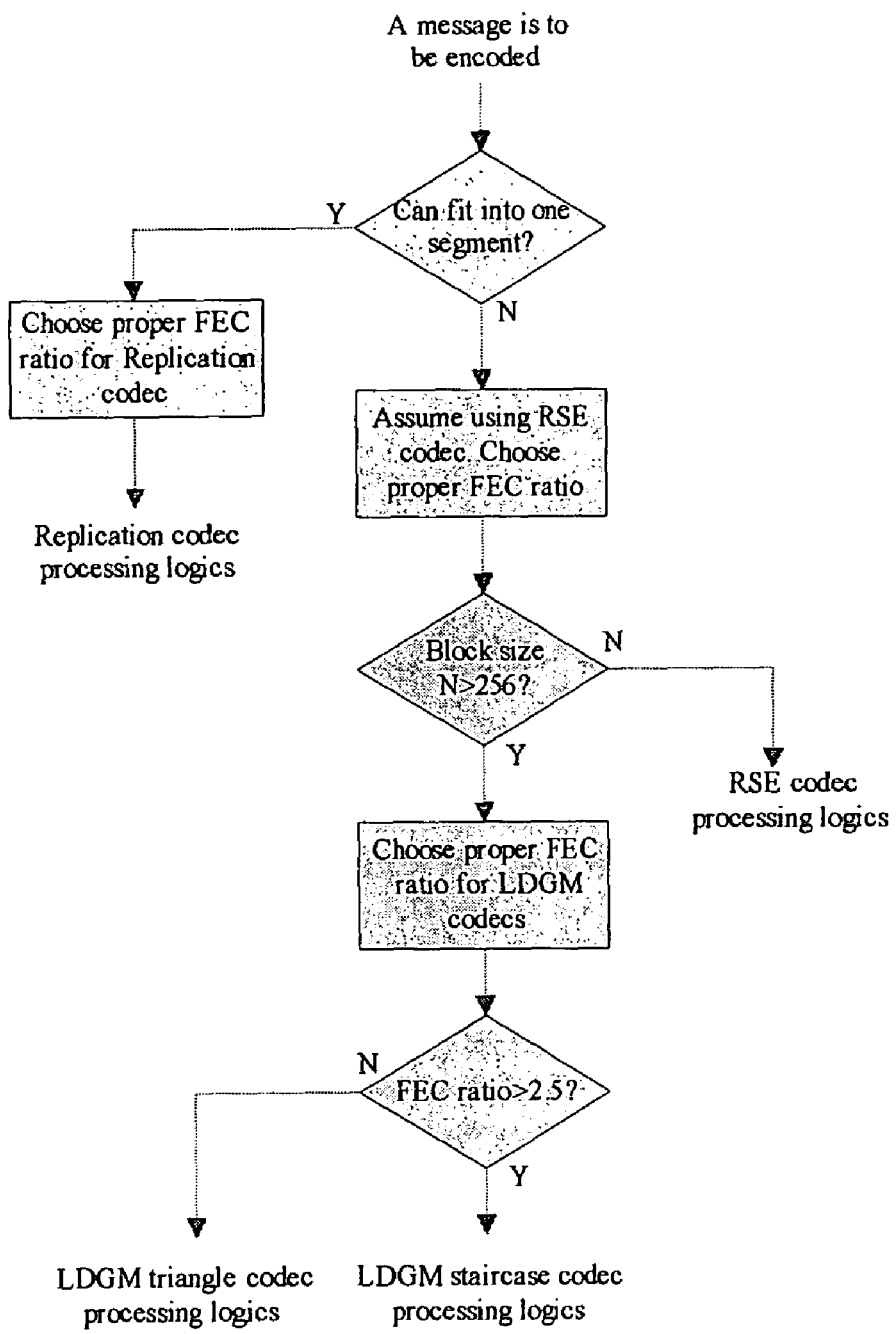
FIG. 9 shows a method of selecting an encoding algorithm in accordance with an embodiment of the present invention.

FIG. 9 shows a method of selecting an encoding algorithm in accordance with an embodiment of the present invention. The method of FIG. 9 may be performed by a messaging layer 36 in deciding what encoding algorithm to use. In the example of FIG. 9, an FEC algorithm is used to encode the message. A messaging layer 36 first determines if a message can fit in a single segment. If it can (i.e. the message is relatively small), an FEC ratio (i.e. ratio of block size to source size) for a replication codec is determined and the message is encoded using the logic of the replication codec. If the message is of medium size (e.g. block size less than 256), the message is encoded using a Reed-Solomon Erasure (RSE) codec. If the message is of relatively large size (e.g. block size greater than 256), an LGDM triangle codec may be used if the FEC ratio is less than 2.5 or an LDGM staircase codec may be used if the FEC ratio is greater than 2.5, for example.

Provided the recipient must at least get X number of encoded packets of the total N encoded packets (block size) to recreate all the source packets, an inefficient ratio (I) is the ratio of X to the source size (i.e. number of source packets). For small block FEC algorithms, such as replication and RSE algorithms, the inefficient ratio (I) may be 1.0. For large block FEC algorithms, such as LDGM triangle and staircase algorithms, the inefficient ratio (I) may be slightly bigger than 1.0. Table 2 shows estimated inefficient ratios for LDGM triangle and staircase algorithms.

TABLE 2

| FEC codec | FEC ratio | Inefficient ratio |
|---|---|---|
| LDGM triangle | 1.0~1.5 | 1.1 |
|  | 1.5~2.0 | 1.15 |
|  | 2.0~2.5 | 1.2 |
| LDGM staircase | 2.5~3.5 | 1.25 |
|  | 3.5~4 | 1.3 |
|  | 4~5 | 1.35 |

The FEC ratio (F) may be calculated given an inefficient ratio (I), message size (M), and block size (B) as follows.

For replication codec:

$$1 - Pl^B \geq Pd$$

$$F = B$$

For RSE codec:

$$\sum_{n=M}^{B} C_B^n (1-Pl)^n Pl^{B-n} \geq Pd$$

$$F = \frac{B}{M}$$

For LDGM codecs:

$$\sum_{n=\lceil M \cdot I \rceil}^{B} C_B^n (1-Pl)^n Pl^{B-n} \geq Pd$$

$$F = \frac{B}{M}$$

Table 3 shows examples of FEC ratios (F) for replication and RSE codecs.

TABLE 3

| Source size | $Pl \leq 40\%$ $Pd \geq 99.9\%$ | $Pl \leq 40\%$ $Pd \geq 99\%$ | $Pl \leq 50\%$ $Pd \geq 99.9\%$ | $Pl \leq 50\%$ $Pd \geq 99\%$ | $Pl \leq 60\%$ $Pd \geq 99.9\%$ | $Pl \leq 60\%$ $Pd \geq 99\%$ | $Pl \leq 70\%$ $Pd \geq 99.9\%$ | $Pl \leq 70\%$ $Pd \geq 99\%$ |
|---|---|---|---|---|---|---|---|---|
| 1 | 8.00 | 5.00 | 10.00 | 7.00 | 14.00 | 9.00 | 20.00 | 13.00 |
| 2 | 5.50 | 4.00 | 7.00 | 5.50 | 9.50 | 7.00 | 13.50 | 10.00 |
| 3 | 4.67 | 3.67 | 6.00 | 4.67 | 8.00 | 6.00 | 11.00 | 8.33 |
| 4 | 4.00 | 3.25 | 5.25 | 4.25 | 7.00 | 5.50 | 9.75 | 7.50 |
| 5 | 3.80 | 3.00 | 4.80 | 3.80 | 6.40 | 5.00 | 8.80 | 7.00 |
| 7 | 3.29 | 2.86 | 4.29 | 3.57 | 5.57 | 4.57 | 7.71 | 6.29 |
| 10 | 3.00 | 2.60 | 3.80 | 3.20 | 4.90 | 4.20 | 6.80 | 5.80 |
| 15 | 2.73 | 2.40 | 3.40 | 3.00 | 4.40 | 3.87 | 6.07 | 5.27 |
| 30 | 2.37 | 2.17 | 2.93 | 2.67 | 3.80 | 3.40 | 5.20 | 4.67 |
| 50 | 2.20 | 2.04 | 2.72 | 2.52 | 3.48 | 3.20 | 4.72 | 4.36 |
| 100 | 2.04 | 1.94 | 2.48 | 2.36 |  |  |  |  |

Table 4 shows examples of FEC ratios (F) for replication and LDGM codecs based on inefficient ratio (I) estimates shown in Table 2.

TABLE 4

| Source size | $Pl \leq 40\%$ $Pd \geq 99.9\%$ | $Pl \leq 40\%$ $Pd \geq 99\%$ | $Pl \leq 50\%$ $Pd \geq 99.9\%$ | $Pl \leq 50\%$ $Pd \geq 99\%$ | $Pl \leq 60\%$ $Pd \geq 99.9\%$ | $Pl \leq 60\%$ $Pd \geq 99\%$ | $Pl \leq 70\%$ $Pd \geq 99.9\%$ | $Pl \leq 70\%$ $Pd \geq 99\%$ |
|---|---|---|---|---|---|---|---|---|
| 50 |  |  |  |  | 4.48 | 4.24 | *6.16 | *5.68 |
| 100 | 2.40 | 2.28 | 3.05 | 2.90 | 4.00 | 3.80 | **5.60 | **5.30 |
| 200 | 2.28 | 2.20 | 2.88 | 2.78 | 3.80 | 3.65 | ***5.25 | ***5.05 |
| 400 | 2.19 | 2.14 | 2.78 | 2.70 | 3.63 | 3.53 | ****5.05 | 4.90 |
| 700 | 2.14 | 2.11 | 2.71 | 2.64 | 3.53 | 3.34 | 4.91 | 4.82 |
| 1000 | 2.12 | 2.09 | 2.66 | 2.63 | 3.35 | 3.29 | 4.83 | 4.75 |
| 2000 | 2.09 | 1.98 | 2.62 | 2.59 | 3.30 | 3.25 | 4.75 | 4.70 |
| 4000 | 1.97 | 1.96 | 2.48 | 2.46 | 3.24 | 3.21 | 4.66 | 4.63 |

TABLE 4-continued

| Source size | Pl ≤ 40% Pd ≥ 99.9% | Pl ≤ 40% Pd ≥ 99% | Pl ≤ 50% Pd ≥ 99.9% | Pl ≤ 50% Pd ≥ 99% | Pl ≤ 60% Pd ≥ 99.9% | Pl ≤ 60% Pd ≥ 99% | Pl ≤ 70% Pd ≥ 99.9% | Pl ≤ 70% Pd ≥ 99% |
|---|---|---|---|---|---|---|---|---|
| 7000 | 1.96 | 1.95 | 2.46 | 2.45 | 3.21 | 3.19 | 4.62 | 4.59 |
| 10000 | 1.95 | 1.94 | 2.45 | 2.44 | 3.19 | 3.18 | 4.60 | 4.58 |
| 100000 | 1.93 | 1.93 | 2.42 | 2.41 | 3.15 | 3.14 | 4.53 | 4.52 |

*Due to limits of LDGM codecs, FEC ratio of 5.0 should be used. Pd will reach 85%.
**Due to limits of LDGM codecs, FEC ratio of 5.0 should be used. Pd will reach 93%.
***Due to limits of LDGM codecs, FEC ratio of 5.0 should be used. Pd will reach 97.8%.
****Due to limits of LDGM codecs, FEC ratio of 5.0 should be used. Pd will reach 99.8%.

As previously discussed, two file transport layers 34 may exchange messages to provide file delivery services. In one embodiment, file transport layers 34 employ a client/server model. A client may be a network entity that wants to put or get a file from a server. In a client/server model, the client initiates communications to servers. A server may be a network entity that holds files to be delivered to clients. A server may not provide a file to a client unless specifically requested to do so. In the example of FIG. 2, the vendor server computer 10 (the server) may provide the update file 16 to the client customer computer 14 (the client) upon request by the client customer computer 14. The request may be initiated by the antivirus program 15, which may be configured to periodically request for update files.

Figure 10:
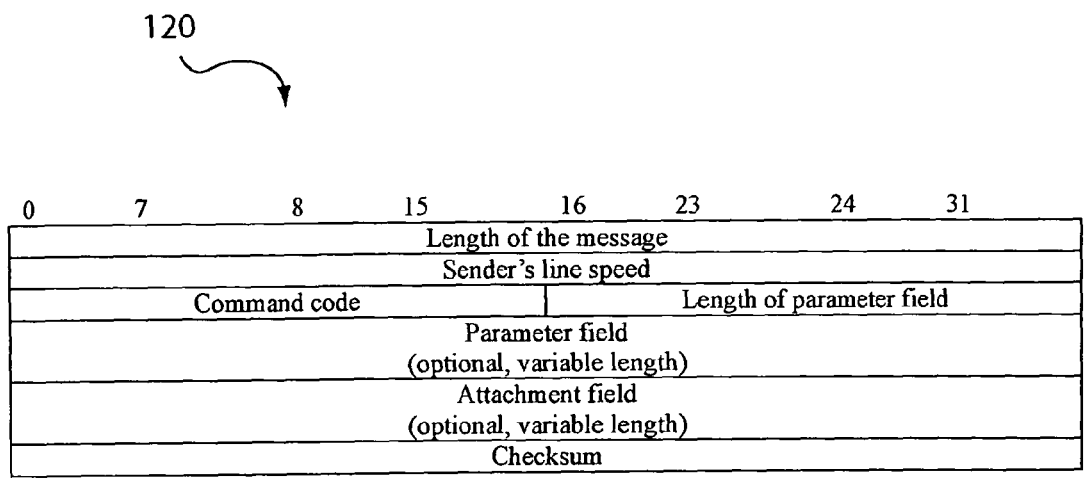
FIG. 10 schematically shows a message in accordance with an embodiment of the present invention.

FIG. 10 schematically shows a message 120 in accordance with an embodiment of the present invention. The message 120 may be exchanged between transport layers 34. Table 5 provides a description of the fields of an example message 120. The fields of a message 120 may be varied without detracting from the merits of the present invention.

TABLE 5

| | |
|---|---|
| Length of the message | 4 bytes integer. Length of the whole message in bytes from first byte of the message to and include the checksum field. |
| Sender's line speed | 4 bytes integer. Line speed of sender's network interface's down stream in Kbps. For example, the value should be 100000 for a 100BaseT network connection. This field is filled by clients when they send request messages. |
| Command code | 2 bytes unsigned integer. Identify which command the message carries. Values: <32768 requests >32767 responses |
| Length of parameter field | 2 bytes unsigned integer. Indicates the length of parameter field in bytes. |
| Parameter field | Variable length field that holds parameters for specific command. |
| Attachment field | Variable length field that holds attachment of a command, usually a file to be delivered. |
| Checksum | 4 bytes unsigned integer. Sum (mod 2^32) of all long integers of the whole message contents. If the length of the message is not aligned at 4 bytes boundaries, pad the message with zeros. |

In the example of Table 5, the command code may support the previously discussed GET and PUT commands and other commands depending on the application. The Attachment field may contain the attachment (e.g. an update file) for a command.

Figure 11:
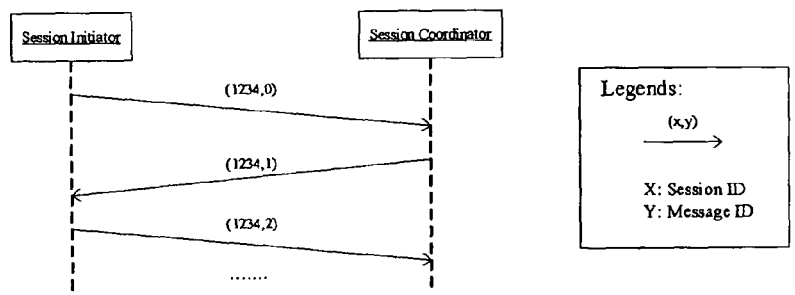
FIG. 11 schematically illustrates a general session for file transport layers in accordance with an embodiment of the present invention.

FIG. 11 schematically illustrates a general session for file transport layers 34 in accordance with an embodiment of the present invention. As shown in FIG. 11, a file transport layer 34 may use a session style communications model. A peer that initiated a session (i.e. a file transport layer 34) is session initiator while the opposite peer (i.e. the other file transport layer 34) is session coordinator. A session may be uniquely identified by a 6 byte integer session ID (e.g. see message 40 shown in FIG. 4). A message may be uniquely identified by a 1 byte integer message ID and the session ID. The first message of a session may always have a message ID of 0. The following messages in the same session may be identified by message ID of 1, 2, 3, etc. Messages going in two directions may always be interlaced. Identical session IDs for different sessions should not appear for a certain period of time, even for different peers. Pseudo random numbers may be used as session IDs.

Session coordinators may save the session IDs of recent processed messages whose message ID is 0 as listed in a blacklist. When a new segment with message ID of 0 comes, session coordinators may look for the appearance of the same session ID in the blacklist. If the same session ID is already in the blacklist, the peer should discard the segment as if it never reached the peer. The items in the blacklist should have a timestamp.

Peers in a session that are waiting for a message, which is treated as a response of a previously sent message, may monitor a timer T1 of a messaging layer 36. If the timer T1 indicates a timeout, the peers should move to an error state and discard everything about the session (see state diagram in FIG. 7). If necessary, session initiators may create a new session to resend requests to session coordinators. The session ID of the new session should not be identical to previous session IDs.

Figure 12:
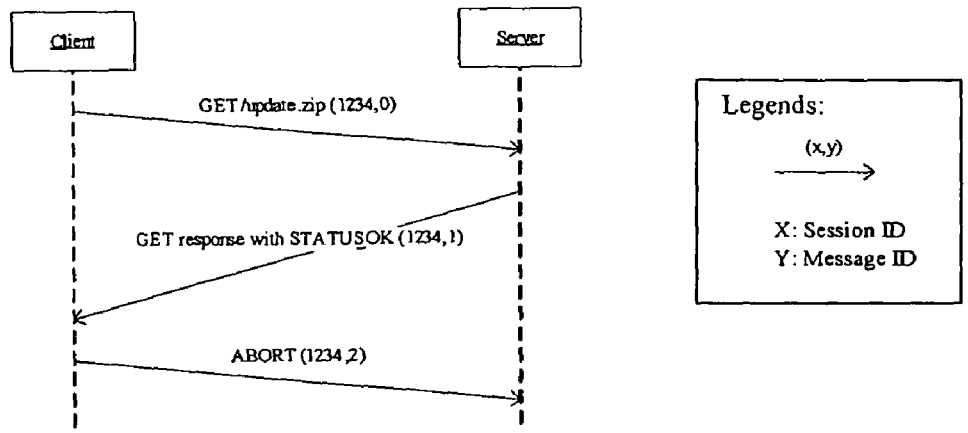
FIG. 12 schematically illustrates a client/server session for file transport layers in accordance with an embodiment of the present invention.

FIG. 12 schematically illustrates a client/server session for file transport layers 34 in accordance with an embodiment of the present invention. In practice, most sessions are client/server sessions. A client/server session may be initiated when the client sends a request message to a server. In the example of FIG. 12, the client sent a GET command to receive a file (e.g. update file) from the server. The server then provides a response, which may contain the file. Because the file may be big, the client may send an ABORT command to stop the transmission of segments from the server to the client as soon as the client has received enough segments to recreate the file. This advantageously minimizes use of network bandwidth.

Figure 13:
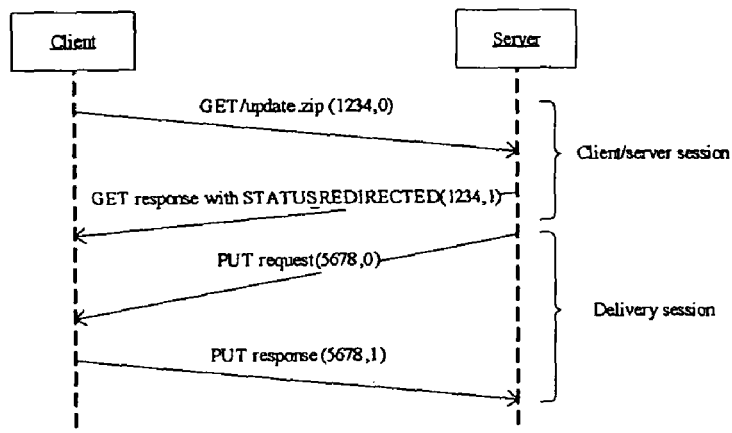
FIG. 13 schematically illustrates a delivery session for file transport layers in accordance with an embodiment of the present invention.

FIG. 13 schematically illustrates a delivery session for file transport layers in accordance with an embodiment of the present invention. A delivery session is a special case where the server is the session initiator and the client is the session coordinator. A delivery session is preferably combined with a client/server session. In the example of FIG. 13, a client/server session initiated by the client to get an update file ("update.zip" in the example) results in the server responding with a STATUS_REDIRECTED, meaning the request to get the update file will be responded to in a following delivery session. In the delivery session, the server sends a PUT request (a PUT command to store a file) to the client to store the update file in the client. The PUT request may be sent in a message that includes the update file as an attachment. When the client receives enough segments to recreate the update file, the client may optionally respond with a PUT response (a special PUT command for responding to a PUT request) to tell the server to stop sending the rest of the message. An advantage of using a delivery session instead of just including the update file as an attachment in a response to a GET command in a client/server session is that it allows for delivery session sharing when multiple clients send a GET command for the same file.

Figure 14:
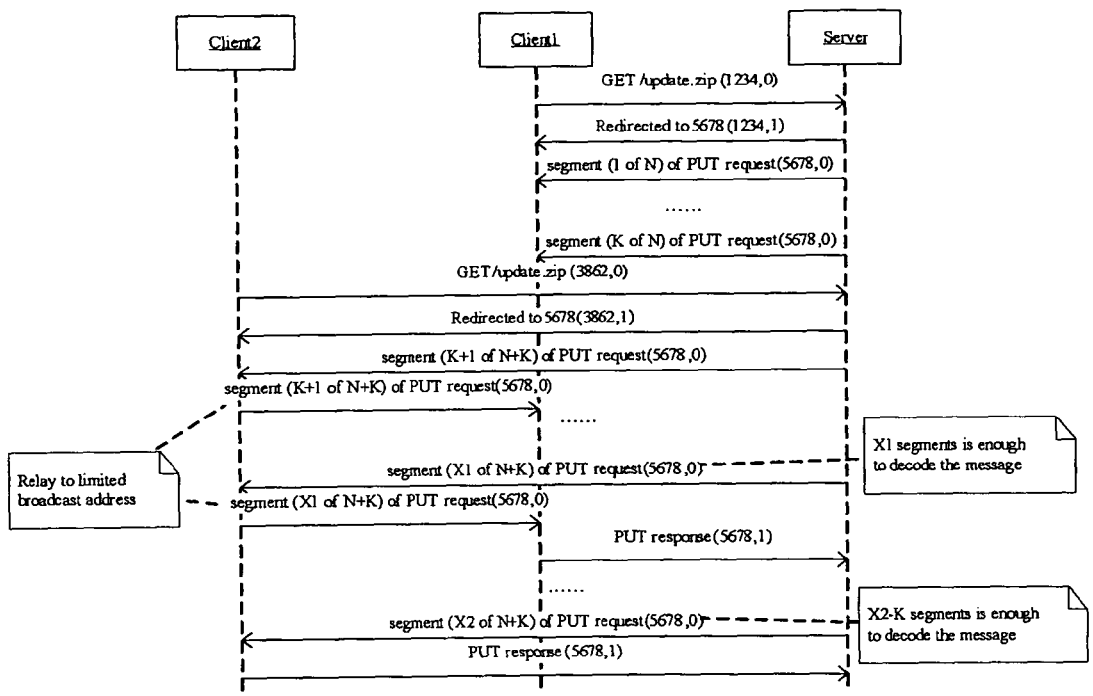
FIG. 14 schematically illustrates delivery session sharing in accordance with an embodiment of the present invention.

FIG. 14 schematically illustrates delivery session sharing in accordance with an embodiment of the present invention. In the example of FIG. 14, client1 sends a GET request to the server and is informed that the file will be delivered in a delivery session. The delivery session then starts to run and sends up to N segments of PUT messages to client1. During the delivery session, while client1 received K segments that are not enough to decode the PUT message, client2 sends a GET request to the server for the same file. The server then informs client2 that the file is being delivered in an existing delivery session. The server then changes the upper limit of the segments to be sent to N+K. That is, the server will resend segments 1 to K after it is done sending N segments. After the client2's GET request, the server will send succeeding delivery session segments to client2 with the B.flag set. When client2 received these segments with B.flag set, it then relays them to a limited broadcast address and have client1 receive them. After some time, client1 and client 2 may finish receiving the file and send PUT responses to the server. When the server receives both PUT responses from the clients, the server stops sending further segments of the PUT request message. Even if some of the clients don't send PUT responses, the server may finish the delivery session when all segments containing the file have been sent. For 3 or more clients that are requesting the same file, the process is similar to that in FIG. 14 except that the client that will relay the segments may change several times during the entire process.

Figure 15:
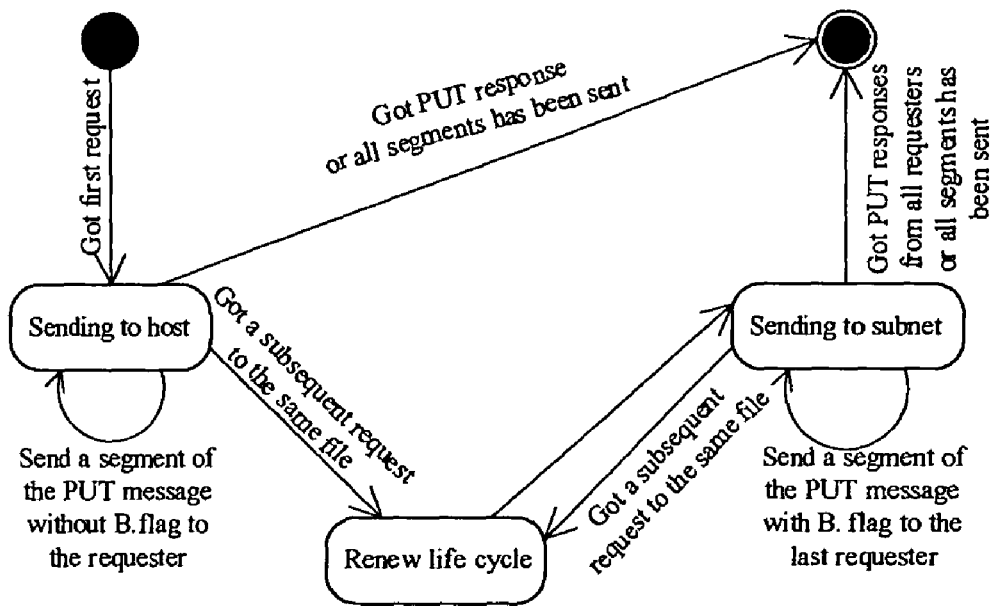
FIG. 15 schematically shows an example state transition diagram that a server may employ in a delivery session sharing in accordance with an embodiment of the present invention.

FIG. 15 schematically shows an example state transition diagram that the server may employ in a delivery session sharing in accordance with an embodiment of the present invention. Other state transition diagrams may also be employed without detracting from the merits of the present invention.

In one embodiment, traffic control up stream from customer client computers to a vendor server computer employs a fixed bandwidth policy. For each request originated from a customer client computer, a messaging layer 36 in a client computer may control its segment transmission speed to limit its bandwidth consumption to be below a threshold value $T_c$, which may be equal to about 20 Kbps, for example. Concurrent requests from customer client computers may jam the weakest link in the network. In that case, a customer client computer may back off and retry the request after some delay.

In one embodiment, traffic control downstream from a vendor server computer to customer client computers may be implemented according to the variables shown and described in Table 6.

TABLE 6

| Name | Description | Origin | Example value |
|------|-------------|--------|---------------|
| Lc | Line speed of the client's network connection | Clients get it from the operating system and encapsulate it in request messages | 10 Mbps for a 10 BaseT link |
| Uc | Maximum utilization of client's network connection | Configuration. | 0.1 |
| Ls | Line speed of the server's network connection | Server gets it from the operating system. | 100 Mbps for a 100 BaseT link |
| Us | Maximum utilization of server's network connection | Configuration | 0.8 |
| Lw | Line speed of the weakest link in the network | Configuration | 2 Mbps for a E1 link |
| Uw | Maximum utilization of the weakest link | Configuration | 0.5 |

Each down stream connection to a customer client computer may be assumed to have a bandwidth quota $Q_s$. Vendor server computers may schedule all down stream connections based on a policy satisfying the following constrains:

For each client:

$$Q_s \leq L_c \cdot U_c$$

For all clients:

$$\Sigma Q_s \leq L_s \cdot U_s$$

$$\Sigma Q_s \leq L_w \cdot U_w$$

In deciding values for Uc, Us, Lw and Uw, the main consideration should be to not jam the network by down stream connections whether the network is already jammed or not.

Vendor server computers may employ a weighted round robin algorithm to schedule all down stream data delivery. Weight assignment may be fixed or dynamic, for example.

A fixed weight policy is relatively simple in that every stream has the same weight value. A fixed weight policy may be used for most applications.

For improved performance, a dynamic weight assignment policy may be employed. An example dynamic weight assignment policy is as follows:

Every stream has a fixed initial weight, say 10.

If a stream changes to a relay mode, 5 will be added to its weight.

1 will be added to a stream's weight every 5 seconds.

A stream's weight will not exceed 50 under any condition.

Figure 16:
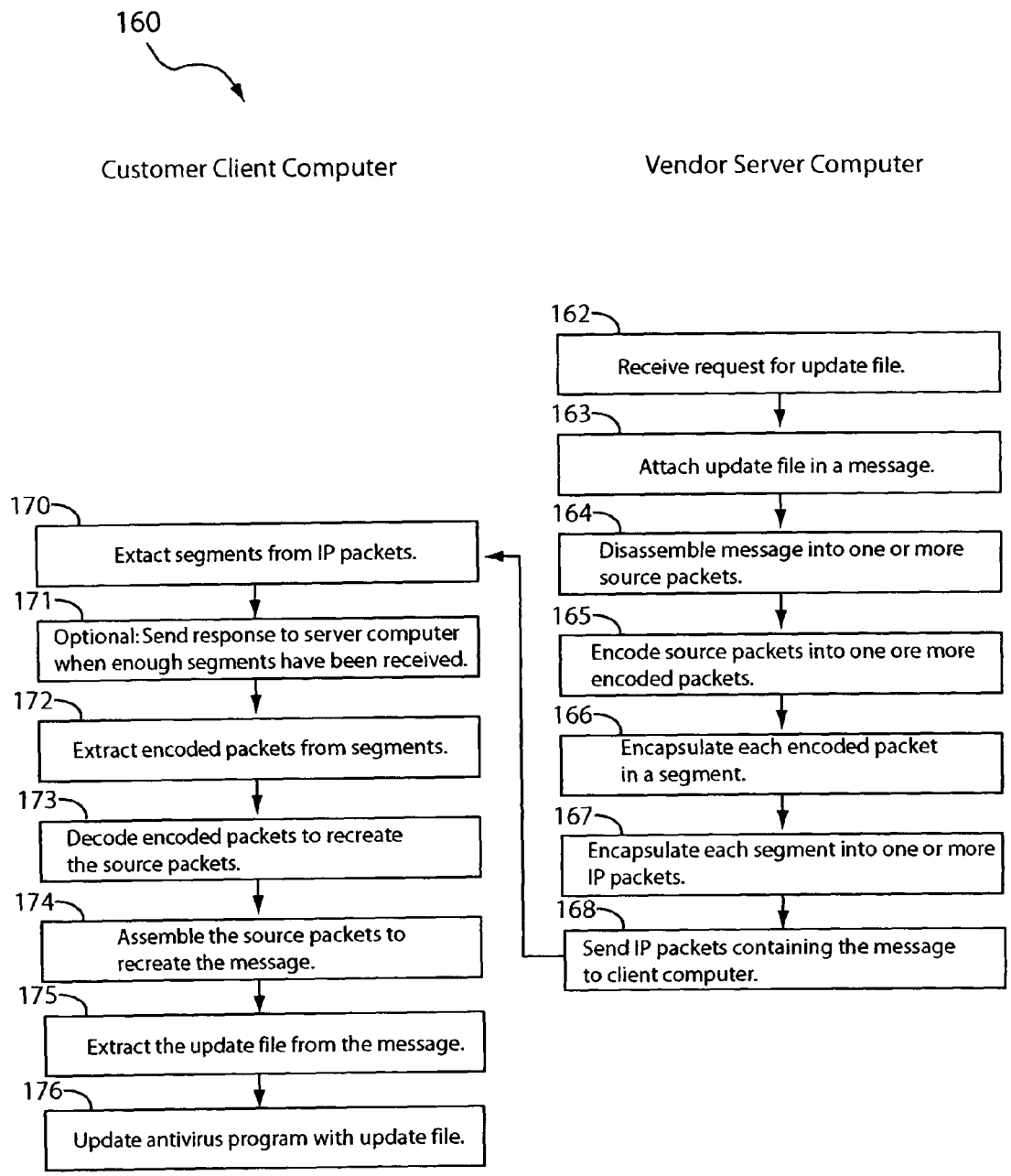
FIG. 16 shows a flow diagram of a method of delivering update files for antivirus programs in accordance with an embodiment of the present invention.

FIG. 16 shows a flow diagram of a method 160 of delivering update files for antivirus programs in accordance with an embodiment of the present invention. In the example of FIG. 16, the steps on the left hand column are performed by a customer client computer having an antivirus program, while the steps on the right hand column are performed by a vendor server computer configured to provide update files to the customer client computer. The customer client computer and the vendor server computer may employ a networking protocol stack 30 (see FIG. 3) to perform the steps.

Beginning in step 162, the vendor server computer receives a request for an update file from the customer client computer.

The request for the update file may be initiated by the antivirus program in the customer client computer.

In step 163, a file transport layer in the vendor server computer attaches the update file to a message and provides the message to an underlying messaging layer in the vendor server computer.

In step 164, the messaging layer in the vendor server computer disassembles the message into one or more source packets.

In step 165, the messaging layer in the vendor server computer encodes the source packets to generate one or more encoded packets. In one embodiment, the source packets are encoded using an FEC algorithm. The FEC algorithm may be chosen based on the size of the message. The generated encoded packets may comprise the source packets and redundant packets. The redundant packets may include information that allows a receiver to recreate the source packets even if some of the encoded packets get lost during transmission (e.g. over a congested network during a virus outbreak) and are never received in the customer client computer.

In step 166, the messaging layer in the vendor server computer encapsulates each encoded packet in a segment and provides the segment to under layers in the vendor server computer.

In step 167, the under layers in the vendor server computer encapsulate each segment in one or more IP packets. The under layers may comprise UDP/IP layers for example.

In step 168, the under layers transmit the IP packets for the message from the vendor server computer to the customer client computer.

In step 170, under layers in the customer client computer receive the IP packets, extract the segments from the IP packets, and provide the segments to a messaging layer in the customer client computer.

In step 171, an optional step, the messaging layer in the customer client computer determines if there are enough received segments to recreate the message and, if so, sends a corresponding response to the vendor server computer to stop further transmission of the IP packets containing the message.

In step 172, the messaging layer in the customer client computer extracts the encoded packets from the segments.

In step 173, the messaging layer in the customer client computer decodes the encoded packets to recreate the source packets.

In step 174, the messaging layer in the customer client computer assembles the source packets to recreate the message and provides the message to a file transport layer in the customer client computer.

In step 175, the file transport layer in the customer client computer extracts the update file from the message and provides the update file to the antivirus program.

In step 176, the antivirus program is updated using the update file.

Methods and systems for reliable delivery of updates to antivirus programs have been disclosed. While specific embodiments of the present invention have been provided, it is to be understood that these embodiments are for illustration purposes and not limiting. For example, while the above embodiments are particularly suitable for delivering updates to antivirus programs during a virus outbreak, the embodiments may be adapted to deliver any type of data over a packet network under a variety of network conditions. Many additional embodiments will be apparent to persons of ordinary skill in the art reading this disclosure.

What is claimed is:

1. A method of delivering updates to an antivirus program over a packet network, the method comprising:
   disassembling an update file for an antivirus program into a plurality of source packets, the antivirus program being resident in a customer client computer;
   dynamically selecting an FEC algorithm from a plurality of FEC algorithms based on a size of the update file, comprising:
   selecting a replication algorithm when the size of the update file is small;
   selecting one of Minimum Distance Separation (MDS) FEC algorithms comprising Reed-Solomon Erasure (RSE) algorithm when the size of the update file is medium; and
   selecting one of large block FEC algorithms comprising Low Density Parity Check (LDPC) algorithm and Low Density Generator Matrix (LDGM) algorithm, when the size of the update file is large;
   encoding the source packets using the selected forward error correction (FEC) algorithm to generate a plurality of encoded packets, the plurality of encoded packets including redundant packets containing information allowing the customer client computer to recreate the plurality of source packets when one of the plurality of encoded packets is never received in the customer client computer;
   encapsulating the plurality of encoded packets with a user datagram protocol (UDP);
   transmitting the plurality of encoded packets from a vendor server computer to the customer client computer over a packet network.

2. The method of claim 1 wherein the update file is attached to a message that is disassembled into the plurality of source packets.

3. The method of claim 1 further comprising:
   receiving a set of encoded packets in the plurality of encoded packets in the customer client computer;
   decoding the set of encoded packets to recreate the plurality of source packets;
   assembling the plurality of source packets to recreate the update file; and
   updating the antivirus program using the update file.

4. The method of claim 3 further comprising:
   sending a response from the customer client computer to the vendor server computer, the response indicating that the customer client computer has received a number of the plurality of encoded packets enough to recreate the plurality of source packets in the customer client computer.

5. The method of claim 1 wherein the plurality of encoded packets is transmitted from the vendor server computer to the customer client computer in internet protocol (IP) packets.

6. The method of claim 5 wherein each of the plurality of encoded packets is encapsulated in a segment that is encapsulated in an IP packet.

7. The method of claim 1 wherein the plurality of encoded packets is transmitted from the vendor server computer to the customer client computer using user datagram protocol (UDP).

8. A server computer having a processor and a memory, the processor running a networking protocol stack in the memory, the networking protocol stack comprising:
   a messaging layer configured to dynamically select an FEC algorithm from a plurality of FEC algorithms based on a size of the update file, comprising:

to select a replication algorithm when the size of the update file is small;

to select one of Minimum Distance Separation (MDS) FEC algorithms comprising Reed-Solomon Erasure (RSE) algorithm when the size of the update file is medium; and to select one of large block FEC algorithms comprising Low Density Parity Check (LDPC) algorithm and Low Density Generator Matrix (LDGM) algorithm, when the size of the update file is large;

the messaging layer configured to encode a plurality of source packets comprising the update file for an antivirus program into a plurality of encoded packets using the selected forward error correction (FEC) algorithm, the encoded packets including the source packets and a plurality of redundant packets, the redundant packets including information that allows a client computer that includes the antivirus program to recreate the source packets when one of the encoded packets is never received in the client computer; and an under layer running under the messaging layer, the under layer comprising a user datagram protocol (UDP), the under layer being configured to encapsulate the encoded packets with the UDP for transmission to the client computer over a packet network.

9. The server computer of claim 8 wherein the networking protocol further comprises:

a file transport layer configured to provide file delivery services in the server computer, the file transport layer being configured to attach the update file to a message, and to provide the message to the messaging layer where the message is disassembled into the plurality of source packets.

10. The server computer of claim 9 wherein the networking protocol further comprises:

an application layer that includes a file server program configured to provide the update file to the file transport layer.

11. The server computer of claim 8 wherein the packet network comprises the Internet.

12. A method of delivering updates to antivirus programs over a packet network, the method comprising:

receiving from a client computer a request for an update file for an antivirus program; disassembling the update file into a plurality of source packets;

dynamically selecting an FEC algorithm from a plurality of FEC algorithms based on a size of the update file, comprising:

selecting a replication algorithm when the size of the update file is small;

selecting one of Minimum Distance Separation (MDS) FEC algorithms comprising Reed-Solomon Erasure (RSE) algorithm when the size of the update file is medium; and selecting one of large block FEC algorithms comprising Low Density Parity Check (LDPC) algorithm and Low Density Generator Matrix (LDGM) algorithm, when the size of the update file is large;

encoding the plurality of source packets into a plurality of encoded packets, the plurality of source packets being encoded using a forward error correction (FEC) algorithm selected from a plurality of FEC algorithms based on a size of the update file, the plurality of encoded packets including redundant packets containing information that allows the client computer to recreate the source packets when an encoded packet in the plurality of encoded packets is never received in the client computer;

encapsulating the plurality of encoded packets with a user datagram protocol (UDP);

transmitting the plurality of encoded packets from a server computer to the client computer over a packet network; and stopping transmission of the plurality of encoded packets to the client computer when the client computer receives enough of the plurality of encoded packets to recreate the plurality of source packets.

13. The method of claim 12 further comprising:

receiving in the client computer a set of encoded packets from the plurality of encoded packets;

decoding the set of encoded packets to recreate the plurality of source packets;

assembling the source packets to recreate the update file; and using the update file to update the antivirus program in the client computer.

14. The method of claim 12 wherein the packet network includes the Internet.

15. The method of claim 12 wherein the plurality of encoded packets is transmitted from the server computer to the client computer in internet protocol (IP) packets.

16. The method of claim 12 wherein the plurality of encoded packets is transmitted from the server computer to the client computer using user datagram protocol (UDP).

17. The method of claim 12 wherein the update file is attached to a message that is disassembled into the plurality of source packets.

18. The method of claim 12 wherein the plurality of FEC algorithms comprises a replication algorithm, a Reed-Solomon Erasure (RSE) algorithm, and a Low Density Generator Matrix (LDGM) algorithm.

* * * * *